June 12, 1962 W. T. BARTOW ET AL 3,038,199
METHOD AND APPARATUS FOR PRESSING MOLDABLE MATERIAL
Filed Jan. 27, 1960 2 Sheets-Sheet 1

INVENTORS
W. T. BARTOW
W. M. DROBISH
BY A. C. Schwarz, Jr.
ATTORNEY

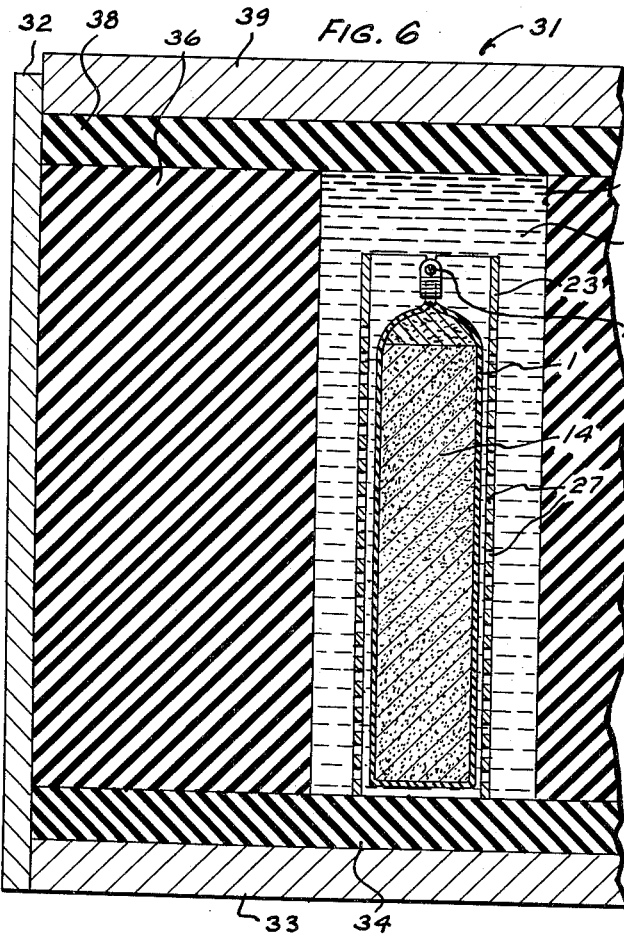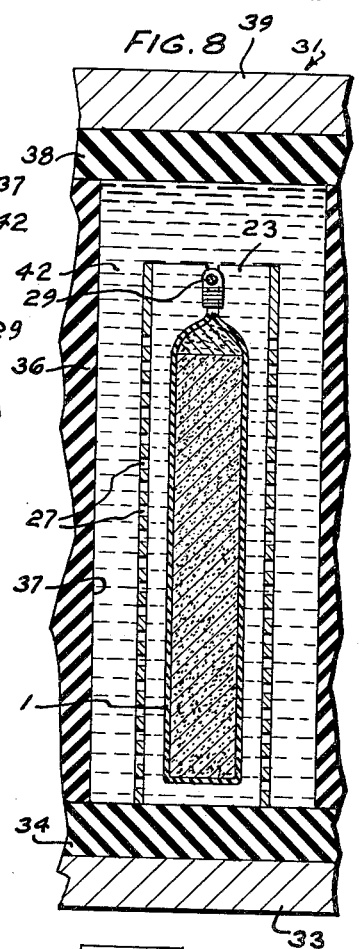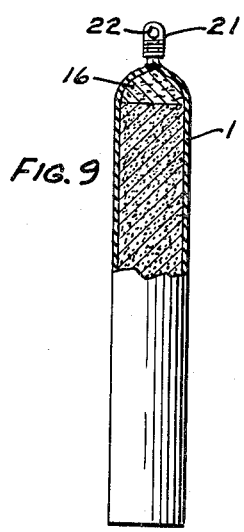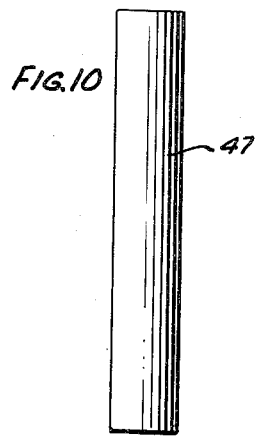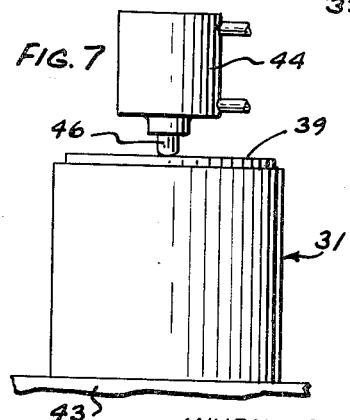

United States Patent Office 3,038,199
Patented June 12, 1962

3,038,199
METHOD AND APPARATUS FOR PRESSING MOLDABLE MATERIAL
Walter T. Bartow, Naperville, and William M. Drobish, Oak Park, Ill., assignors to Western Electric Company, Incorporated, New York, N.Y., a corporation of New York
Filed Jan. 27, 1960, Ser. No. 4,997
10 Claims. (Cl. 18—5)

This invention relates to a new and improved method and apparatus for pressing moldable material into a rigid mass of uniform density, and more particularly to a method and apparatus for the manufacture of ferrite piece parts from ferrite powder for use in micro-wave applications.

Methods of forming moldable material into a rigid mass utilizing pressure exerted on rubber material in direct contact with the material, and also by exerting hydraulic pressure on a membrane containing the material and disposed in a hydraulic liquid medium, are already known and in commercial use. The first of these methods is in general unsatisfactory since it is difficult to apply pressure to the rubber material whereby it will have a uniform flow in all directions so as to exert a uniform pressure over the surface of the material being pressed and produce an article of a specific desired shape and of uniform density. While better results in this respect are obtained in the hydraulic pressure method, the liquid container necessary in this method must be made so as to be absolutely liquid-tight, thereby requiring numerous tight-fitting steel parts and elaborate seals. Further, where the membrane containing the moldable material is freely suspended or floating in the liquid medium, it is subject to movement therein during the pressing operation whereby it may engage against the side walls of the pressure chamber causing breakage or distortion of its contents.

An object of this invention is to provide a new and improved method and apparatus for pressing moldable material into unitary rigid parts by the means of hydraulic pressure induced by the exertion of a force on a resilient deformable material in communication with a hydraulic medium.

Another object of this invention is to provide a new and improved method and apparatus for pressing moldable material into a composite mass of a preselected shape and having a uniform density throughout regardless of shape or size.

A further object of this invention is to provide a new and improved method and apparatus for pressing moldable material into unitary rigid parts having shapes which are difficult to produce by other known means.

A still further object of this invention is to provide a new and improved method and apparatus for pressing moldable material into a composite rigid mass in which air voids in the final pressed product are substantially eliminated.

Another object of this invention is to provide a new and improved method and apparatus for pressing moldable material into unitary rigid parts wherein equal pressures are exerted on the material thereby producing parts free of inner stress which eliminates considerable warping in subsequent firing or sintering operations.

With these and other objects in view, the present invention contemplates a method and apparatus for pressing moldable material into a composite rigid mass of a preselected shape and of uniform density with a minimum of air voids, by the use of hydraulic pressure in a rubber-lined pressing device. In carrying out the invention, a rubber membrane is placed in a mold of predetermined shape and the air is evacuated from between the mold and the membrane whereby the membrane assumes the shape of the mold. The membrane is then filled with the material to be pressed and the air is evacuated from the interior of the membrane and the material. The membrane with the material therein is removed from the mold and suspended in a perforated metal tube, which is then placed in a hydraulic liquid medium enclosed by the rubber lining of the pressing device. A force is applied to the rubber lining of the pressing device and is transmitted by the hydraulic liquid medium uniformly over the surface of the membrane to press the material therein. The membrane is then removed from the hydraulic liquid medium and washed and dried, whereupon the pressed mass may be removed from the membrane and subjected to further processing by conventional methods as may be required.

Other objects, advantages and novel aspects of the invention will become apparent upon consideration of the following detailed description in conjunction with the accompanying drawings wherein:

FIG. 6 is a partial cross-sectional view of a pressing device showing the perforated metal tube and rubber membrane, as shown in FIG. 5, disposed therein;

FIG. 7 is a schematic view of the pressing device showing one manner in which a force may be applied thereto;

FIG. 8 is a partial cross-sectional view of the rubber membrane in the pressing device after being pressed;

FIG. 9 is a view partially in cross-section of the rubber membrane after being removed from the pressing device and the perforated metal tube; and FIG. 10 is a side view of the finished part removed from the rubber membrane.

Figure 1:
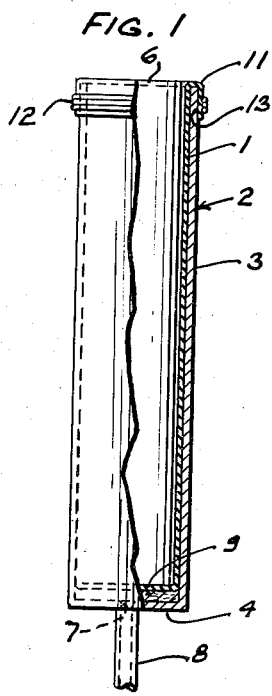
FIG. 1 is a side view, partially in cross section, of a metal mold for forming a rubber membrane to a preselected shape, showing how the membrane assumes the shape of the mold when the air is evacuated from between the mold and the membrane.

FIG. 1 shows a preferred device for carrying out the initial step in pressing moldable material according to the method of the present invention, namely, forming a flexible rubber membrane 1 to the shape of a metal mold 2 having an inside contour corresponding to the shape desired in the final pressed part. In this respect, allowances are made in the size of the mold to compensate for shrinkage which occurs in pressing and subsequent firing, the amount of shrinkage depending on the density of the material prior to pressing and the density required in the finished part.

For purposes of illustration, the metal mold 2 is shown as comprising a cylinder 3 having a bottom 4 and an open top 6. The mold bottom 4 has an aperture 7 formed therein and a vacuum line 8 is connected to the bottom around the aperture and leads to a suitable vacuum source (not shown), thereby providing a means whereby the air may be evacuated from the interior of the mold. A filter pad 9 of a suitable material, such as felt, is positioned in the mold and covers the bottom 4 thereof. The rubber membrane 1 is positioned in the mold 2 with a portion at the top thereof folded over the upper edge of the cylinder 3 as at 11 and secured in place by a suitable binding 12, such as a string, wire or rubber band, which forms an air-tight seal between the cylinder and the rubber membrane at 13. With the apparatus thus assembled, when a vacuum is applied to the interior of the mold by means of the vacuum line 8, the air will be evacuated from between the mold and the rubber membrane 1 and the membrane will be drawn against the pad 9 and interior wall of the cylinder 3 to assume the contour formed thereby.

It is to be understood that where an article to be formed has an irregular shape which would preclude removal thereof from a unitary mold as shown in the drawings, a split-type mold may be used or the unitary mold may be provided with a split-mold liner having a suitable aperture therein mating with the aperture 7.

Figure 2:
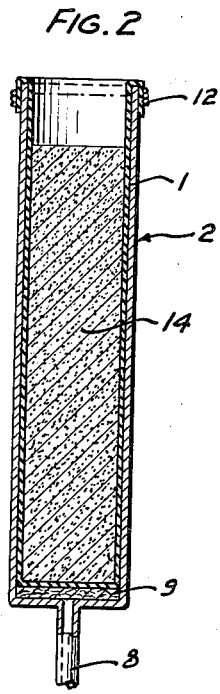
FIG. 2 is a cross-sectional view of the mold in FIG. 1 after the material to be pressed has been placed in the rubber membrane.

When the air has been evacuated from the mold 2 between the mold and the rubber membrane 1, whereby the membrane has assumed the contour of the mold, the vacuum line is sealed closed by a suitable valve means (not shown). The membrane 1 is then filled with moldable material 14 having the required characteristics for use in a pressing process, as shown in FIG. 2. During this filling process, the mold 2 is vibrated by shaking, tapping with a hammer, or other suitable means, so as to pack the moldable material therein to a uniform density.

Figure 3:
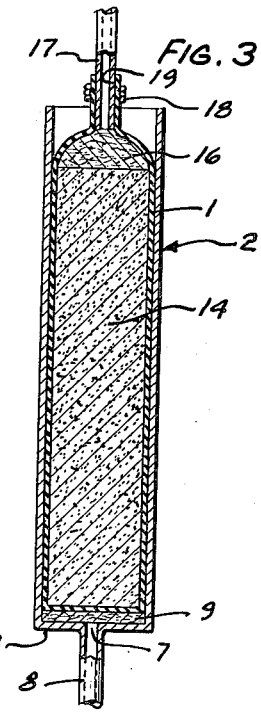
FIG. 3 is a cross-sectional view showing the manner in which air is evacuated from the material and the interior of the rubber membrane.

Referring to FIG. 3, after the moldable material 14 has been placed in the mold 2, a packing 16 of a porous compressible material, such as cotton, is inserted in the rubber membrane 1 over the top of the material, the binding 12 is removed, and the top portion of the membrane is brought together around one end of a vacuum line 17 connected at its other end to the above-mentioned vacuum source (not shown). A rubber band 18 is placed around the top portion of the rubber membrane 1 and the vacuum line 17 to form an air-tight seal therebetween as at 19. A vacuum is then applied to the interior of the rubber membrane 1 through the vacuum line 17 whereby the air is evacuated from within the membrane and the moldable material 14 therein. The vacuum line 17 is then removed from the rubber membrane 1 very rapidly whereby the opening in the membrane will be constricted by the rubber band 18 and sealed closed.

Figure 4:
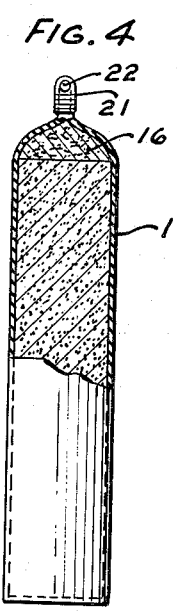
FIG. 4 is a view, partially in section, showing the air-evacuated rubber membrane after it has been sealed and removed from the mold.

The thus molded and air-evacuated rubber membrane 1 and material 14 are now removed from the mold 2 and a suitable clip member 21, having an aperture 22 formed therein, is clipped to the membrane at the top thereof as shown in FIG. 4.

Figure 5:
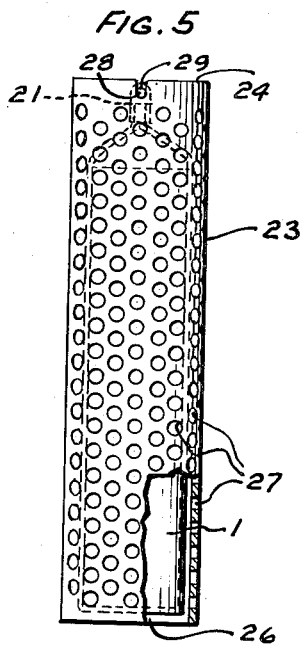
FIG. 5 is a view, partially in section, showing the air-evacuated rubber membrane, as shown in FIG. 4, suspended in a perforated metal tube prior to being placed in a pressing device.

The rubber membrane 1 is next freely suspended within a perforated metal tube 23, as shown in FIG. 5, with the membrane spaced from the sides and bottom edge of the tube. The tube 23 is open-ended as at 24 and 26 and has perforations 27 formed in the wall thereof. A pair of opposed notches 28 are formed in the top edge of the tube 23 and receive a rod member 29 positioned transversely of the top of the tube and extending through the aperture 22 in the clip member 21 to support the filled rubber membrane 1 within the tube.

The material 14 is now ready to be pressed in a pressing device. FIG. 6 shows a preferred form of a pressing device constructed according to the present invention. The pressing device 31 in FIG. 6 comprises an outer steel cylinder 32 closed at its bottom by a steel plate 33 fixedly secured thereto. Disposed in the bottom of the cylinder 32 is a resilient deformable rubber plate liner 34, as for example, of gum rubber. A cylindrical resilient deformable rubber liner 36, having a central cylindrical aperture 37 therethrough, is positioned on top of the rubber liner 34, and a second resilient deformable rubber plate liner 38 is positioned over the cylindrical rubber liner 36, so as to close the ends of the aperture 37 and form a compression chamber therefrom. A removable steel top plate 39 is disposed over the rubber plate liner 38, the liner and steel plate forming a removable piston. The rubber plate liners 34 and 38, the cylindrical rubber liner 36, and the steel top plate 39, are preferably individual members not connected together, or to the steel cylinder 32 or the steel bottom plate 33, so as to have freedom of movement when pressure is applied thereto in the pressing process. Further, while the liners 34, 36 and 38 are preferably all of a resilient deformable material, it is contemplated that one or both of the plate liners 34 and 38 could be eliminated or be constructed of other than a resilient deformable material, or that the cylindrical liner 36 could be of other than a resilient deformable material with at least one of the plate liners of a resilient deformable material.

To press the material 14, the tube 23, with the rubber membrane 1 suspended therein, is carefully placed in the central aperture 37 in the cylindrical rubber liner 36 with its bottom edge resting on the bottom rubber plate liner 34. The central aperture 37 of the cylindrical rubber liner 36 is then completely filled with a suitable hydraulic liquid medium 42, such as water, glycerine or oil, to exclude any entrapped air, and the rubber plate liner 38 and steel plate 39 are placed in position. The perforations 27 in the tube 23 permit the hydraulic liquid medium 42 to flow into the interior of the tube and completely surround the rubber membrane 1 by virtue of its spacing from the side walls and bottom and top edges of the tube.

The pressing device 31 is now placed on a suitable support 43 and a force is applied to the steel top plate 39 as by means of the conventional hydraulic ram 44 having a piston (not shown) and a piston rod 46, in the manner shown in FIG. 7. The force thus applied deforms the rubber plate liners 34, 38 and the rubber cylindrical liner 36, whereby a pressure is exerted through the hydraulic liquid medium 42 uniformly over the surface of the flexible rubber membrane 1 to press the material 14 therein into a composite mass of uniform density, as shown in FIG. 8. In general, favorable results are obtained with a pressure of approximately 20,000 pounds per square inch, although the pressure may be more or less depending on the density of the original moldable material and the density required in the pressed part.

During the pressing operation, the rubber plate liners 34, 38 and cylindrical rubber liner 36 are sealed to each other by the applied pressure whereby liquid will not be forced out of the compression chamber formed by the aperture 37. Further, since the rubber membrane 1 is supported in the perforated tube 23, it is prevented from having any excess movement and is protected from any engagement with the rubber walls of the compression chamber which might break or distort its contents.

After the required pressure has been exerted and the material has been compressed to the desired density, the pressure is reduced to zero. The steel top plate 39 and the rubber plate liner 38 are then removed and the tube 23 and the rubber membrane 1 therein are removed from the pressing device 31. Next, the rubber membrane 1 is removed from the tube 23, as shown in FIG. 9, whereupon the hydraulic liquid medium is washed from the membrane and the membrane is dried. After the rubber is completely dried it is opened and the material 14, now a compact rigid mass 47, as shown in FIG. 10, is removed from the membrane and subjected to further conventional processing as necessary.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:
1. The method of applying uniform compression to material, which method comprises placing the material in a substantially cylindrical rigid container in an oversize cavity having a wall formed by a hollow, fluid-impervious, resilient, deformable liner having an open end and arranged against the inner cylindrical surface of the container, filling the container including the cavity, with a hydraulic medium so that the material is submersed in the medium, and then moving a piston within the cylindrical container to engage and close off the open end of the liner and to compress axially the liner, and thereby to seal the hydraulic medium in the container and to transmit pressure to the material through the hydraulic medium.

2. The method of applying uniform compression to material, which method comprises arranging a hollow, fluid-impervious, resilient, deformable liner having an open end in a substantially cylindrical rigid container against the inner cylindrical surface of the container so as to form a portion of a cavity for receiving the material, placing the material in the cavity in spaced relationship with respect to the resilient deformable liner, filling the container including the cavity with a hydraulic medium so that the material is submersed in the medium, and then moving a piston within the cylindrical container to engage and close off the open end of the liner and to axially compress the liner, and thereby to seal the hydraulic medium in the container and to transmit pressure to the material through the hydraulic medium.

3. The method of applying uniform compression to material, which method comprises preforming the material to a desired shape, suspending the preformed material within an open rigid-walled tube, arranging a hollow fluid-impervious, resilient, deformable liner having an open end in a substantially cylindrical rigid container against the inner cylindrical surface of the container, placing the tube, with the preformed material therein, in the hollow portion of the liner in spaced relationship with respect to the walls of the liner, filling the container, including the hollow portion of the liner, with a hydraulic medium so that the tube and preformed material are submersed in the medium, and then moving a piston within the cylindrical container to engage and close off the open end of the liner and to axially compress the liner, and thereby to seal the hydraulic medium in the container and to transmit pressure to the material by means of the hydraulic medium.

4. The method of applying uniform compression to material, which method comprises placing the material in a fluid-impervious flexible membrane, preforming the material to a desired shape, suspending the membrane and preformed material within a perforated rigid-walled tube in spaced relationship with respect to the walls and ends of the tube, arranging a fluid-impervious resilient deformable rubber liner in a substantially cylindrical rigid container against the inner cylindrical surface of the container, placing the tube, with the membrane and preformed material therein, in the container in spaced relationship with respect to the rubber liner, filling the container with a hydraulic medium so that the tube, membrane and preformed material are submersed in the medium, and then moving a piston within the cylindrical container to engage and to compress axially the rubber liner, and thereby to seal the hydraulic medium in the container and to transmit pressure to the membrane and material through the hydraulic medium.

5. Apparatus for applying uniform compression to material, which comprises a hollow, rigid cylinder having one closed end, a hollow, flexible, resilient, fluid-impervious liner arranged against the inner cylindrical surface of said cylinder, said hollow liner having an open end and being designed to receive material therein in spaced relationship with respect to the walls thereof, a removable piston slidable within said cylinder and engageable with said liner to close off the open end thereof and to form a sealed, variable volume chamber, and a quantity of hydraulic liquid substantially filling the space within the chamber about the material, whereby inward movement of said piston compresses said liner axially and compresses the material through said hydraulic liquid.

6. Apparatus for applying uniform compression to material as recited in claim 5, wherein said liner extends substantially the entire length of said cylinder into engagement with the one closed end thereof.

7. Apparatus for applying uniform compression to material, which comprises a hollow, rigid cylinder having one closed end, a resilient, deformable, fluid-impervious liner arranged against the inner cylindrical surface of said cylinder, a removable piston slidable within said cylinder and engageable with said liner to form a sealed, variable volume chamber, a rigid-walled tube disposed in the chamber in spaced relationship with respect to the walls thereof for receiving and suspending the material in the chamber, and a quantity of hydraulic medium substantially filling the space within the chamber about said tube and the material, whereby inward movement of said piston compresses said liner axially and deforms portions thereof inward into the chamber to compress the material through said hydraulic medium, said tube preventing the deformed portions of said liner from engaging the material.

8. Apparatus for applying uniform compression to material, which comprises a rigid-walled substantially cylindrical container having a closed bottom and an open top, a fluid-impervious resilient deformable plate disposed in the bottom of said container, a fluid-impervious resilient deformable member arranged against the inner cylindrical surface of said container, said member having an aperture extending therethrough and being supported on said resilient deformable plate so as to close one end of the aperture, a second fluid-impervious resilient deformable plate supported on said member and closing the other end of the aperture to form a variable volume chamber for receiving the material in spaced relationship with respect to the walls thereof, a quantity of hydraulic medium substantially filling the space within the chamber about the material, and means for applying an axial compressive force to said plates and to said member whereby portions thereof are deformed inward into the chamber to compress the material through said hydraulic medium.

9. Apparatus for applying uniform compression to material, which comprises a rigid-walled substantially cylindrical container having a closed bottom and an open top, a fluid-impervious resilient deformable plate disposed in the bottom of said container, a fluid-impervious resilient deformable member arranged against the inner cylindrical surface of said container, said member having an aperture extending therethrough and being supported on said plate so as to close one end of the aperture, a second fluid-impervious resilient deformable plate supported on said member and closing the other end of the aperture, a rigid-walled tube disposed in the aperture of said member in spaced relationship with respect to the walls thereof for receiving and suspending the material in the aperture, a quantity of hydraulic medium substantially filling the space within the aperture about said tube and the material, and means for applying an axial compressive force to said plates and to said member whereby portions thereof are deformed inward into the aperture to compress the material through said hydraulic medium.

10. Apparatus for pressing moldable material into a composite rigid mass, which comprises a rigid-walled cylindrical container having a bottom wall and an open top, a fluid-impervious resilient deformable rubber plate disposed in the bottom of said container, a cylindrical fluid-impervious resilient deformable rubber liner arranged against the inner cylindrical surface of said container, said rubber liner having a cylindrical aperture extending therethrough and being supported on said plate so as to close one end of the aperture, a second fluid-impervious resilient deformable rubber plate supported on said liner and closing the other end of the aperture, a perforated rigid-walled tube disposed in the aperture of said liner in spaced relationship with respect to the walls thereof, a fluid-impervious flexible rubber membrane supporting the material in said tube, a quantity of hydraulic medium filling the space within the aperture about said tube and said membrane, and means for applying an axial compressive force to said plates and said liner whereby portions thereof are deformed inward into the aperture to transmit pressure uniformly over the surface of said membrane by means of said hydraulic medium to compress the material.

References Cited in the file of this patent

UNITED STATES PATENTS

| | | |
|---|---|---|
| 2,129,240 | Sanborn | Sept. 6, 1938 |
| 2,172,243 | Goodnow et al. | Sept. 5, 1939 |
| 2,201,706 | Sukohl | May 21, 1940 |
| 2,220,018 | McKenna | Oct. 29, 1940 |
| 2,235,906 | Skoning | Mar. 25, 1941 |
| 2,658,237 | Cuppett et al. | Nov. 10, 1953 |
| 2,781,273 | Koch | Feb. 12, 1957 |
| 2,847,708 | Hamjian et al. | Aug. 19, 1958 |
| 2,893,062 | Penrice | July 7, 1959 |

FOREIGN PATENTS

| | | |
|---|---|---|
| 560,475 | Great Britain | Apr. 5, 1944 |